US008072973B1

(12) United States Patent
Kotha et al.

(10) Patent No.: US 8,072,973 B1
(45) Date of Patent: Dec. 6, 2011

(54) DYNAMIC, POLICY BASED, PER-SUBSCRIBER SELECTION AND TRANSFER AMONG VIRTUAL PRIVATE NETWORKS

(75) Inventors: Murty Subba Rama Chandra Kotha, Sunnyvale, CA (US); Richard Manfred Pruss, Tewantin (AU); Matthew Lawrence King, Headley Down (GB); Jeffrey David Haag, Raleigh, NC (US); Francois Gagne, Casselman (CA)

(73) Assignee: Cisco Technology, Inc., San Jose, CA (US)

( * ) Notice: Subject to any disclaimer, the term of this patent is extended or adjusted under 35 U.S.C. 154(b) by 1184 days.

(21) Appl. No.: 11/639,060

(22) Filed: Dec. 14, 2006

(51) Int. Cl.
*H04L 12/56* (2006.01)
(52) U.S. Cl. ................ 370/389; 726/3; 726/15
(58) Field of Classification Search .......... 370/400, 370/401, 356, 389, 395.53, 351; 709/228, 709/229, 238; 726/3, 15
See application file for complete search history.

(56) References Cited

U.S. PATENT DOCUMENTS

| | | | |
|---|---|---|---|
| 6,687,245 B2 * | 2/2004 | Fangman et al. | 370/356 |
| 6,952,428 B1 | 10/2005 | Necka et al. | |
| 7,055,171 B1 * | 5/2006 | Martin et al. | 726/3 |
| 7,337,224 B1 * | 2/2008 | Van Horne et al. | 709/225 |
| 2003/0054810 A1 * | 3/2003 | Chen et al. | 455/422 |
| 2003/0061321 A1 * | 3/2003 | Roh | 709/222 |
| 2003/0088698 A1 * | 5/2003 | Singh et al. | 709/239 |
| 2003/0182363 A1 | 9/2003 | Clough et al. | |
| 2004/0218611 A1 * | 11/2004 | Kim | 370/401 |
| 2005/0165953 A1 * | 7/2005 | Oba et al. | 709/238 |
| 2006/0013209 A1 * | 1/2006 | Somasundaram | 370/389 |
| 2007/0113275 A1 * | 5/2007 | Khanna et al. | 726/15 |
| 2007/0143486 A1 * | 6/2007 | Kang et al. | 709/229 |
| 2008/0037559 A1 * | 2/2008 | Eriksson | 370/395.53 |
| 2009/0285218 A1 * | 11/2009 | Adamczyk et al. | 370/395.21 |

OTHER PUBLICATIONS

Droms, R., "RFC 2131—Dynamic Host Configuration Protocol", The Internet Engineering Task Force, Mar. 1997, http://www.ietf.org//rfc/rfc2131.txt.
Egevang, K.; Francis, P., "RFC 1631—The IP Network Address Translator (NAT)", Internet RFC/STD/FYI/BCP Archives, May 1994, http://www.faqs.org/rfcs//rfc1631.html.
McGregor, G., "RFC 1332—The PPP Internet Protocol Control Protocol (IPCP)", Internet RFC/STD/FYI/BCP Archives, May 1992, http://www.faqs.org/rfcs/rfc1332.html.

(Continued)

*Primary Examiner* — Dang Ton
*Assistant Examiner* — Kevin Lee
(74) *Attorney, Agent, or Firm* — BainwoodHuang

(57) ABSTRACT

A service gateway maintains forwarding components operative to forward data packets within corresponding VPNs, and also maintains subscriber sessions for subscribers via respective subscriber interfaces. The association between the subscribers and the forwarding components is independent of the subscriber interfaces, such that the subscribers reachable via a given interface are associable with any forwarding component. Upon detecting an appropriate event, such as a service selection action, the service gateway modifies the forwarding components of first and second VPNs to reflect that the subscriber session is active in the second VPN and is not active in the first VPN. The service gateway also effects a change of a network address that identifies the corresponding subscriber from a first network address defined in the first VPN to a second network address defined in the second VPN. Mechanisms for effecting such a change of network address include DHCP, IPCP, RADIUS, and NAT. The service gateway employs control policies to govern the transfer of subscribers among VPNs.

9 Claims, 6 Drawing Sheets

OTHER PUBLICATIONS

"Configuring ISG VRF Transfer (Cisco IOS Release 12.2(28)SB)", Cisco IOS Intelligent Service Gateway Configuration Guide, Release 12.2 SB, Mar. 2006, http://www.cisco.com/en/US/products/ps6566/products_configuration_guide_chapter09186a0080630d78.html.

"Configuring ISG Access for PPP Sessions", Cisco IOS Intelligent Service Gateway Configuration Guide, Release 12.2 SB, Mar. 2006, http://www.cisco.com/en/US/products/ps6566/products_configuration_guide_chapter09186a0080630d61.html.

Pending U.S. Appl. No. 11/607,585, filed Dec. 1, 2006, entitled, "Methods and Apparatus for Dynamic Network Address Reassignment Employing Interim Network Address Translation."

* cited by examiner

DYNAMIC, POLICY BASED, PER-SUBSCRIBER SELECTION AND TRANSFER AMONG VIRTUAL PRIVATE NETWORKS

BACKGROUND

The present invention is related to the field of data communications networks.

It is known to use network devices such as routers, switches and bridges to forward data packets within data communications networks. A router is an example of a device operating at the network layer, or layer 3 of the well-known Open Systems Interconnect (OSI) model. Bridges and switches are examples of layer-2 devices.

It is known to define so-called "virtual private networks" or VPNs within larger (often public) networks such as the global Internet. A VPN can be seen as a collection of specialized network devices and/or specialized functions on otherwise standard network devices that co-operate to carry out data communications in a manner that segregates such communications from other data communications carried by the larger network. There are a variety of known VPN technologies, including technologies based on the Internet Protocol (IP), virtual local area network (VLAN) technologies, and virtual private dial-up networks (VPDNs). Routers may offer support for layer-3 VPNs through the use of multiple so-called "virtual routing and forwarding" tables or VRFs. The VRFs correspond to multiple independent "virtual routers" within a physical router, with each virtual router operating as a node on a corresponding VPN. VLANs generally employ bridging or switching instances located within network devices.

BRIEF DESCRIPTION OF THE DRAWINGS

Example embodiments of the present invention are described with reference to the accompanying drawings, in which.

DESCRIPTION OF EXAMPLE EMBODIMENTS

Overview

Figure 1:
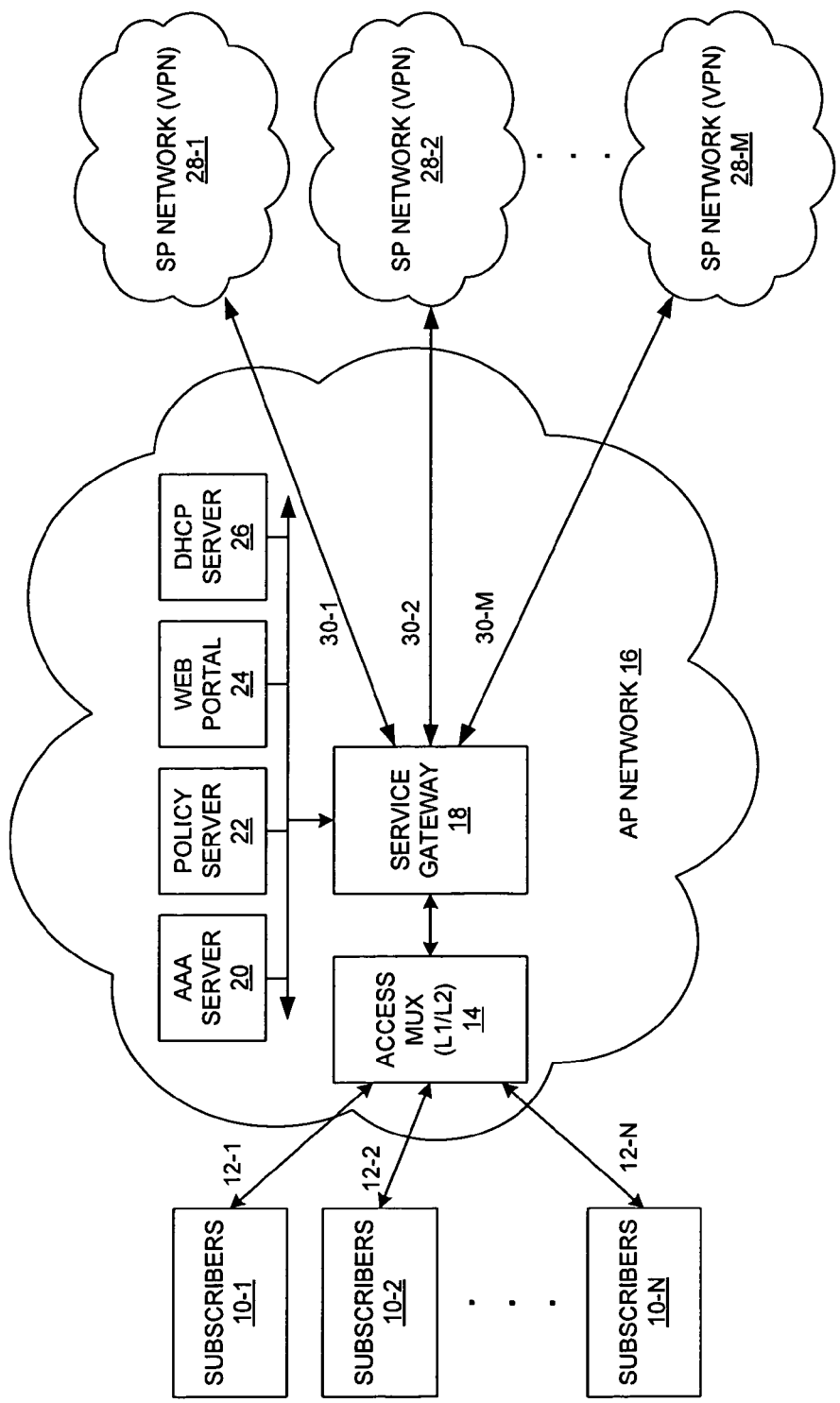
FIG. 1 is a block diagram of a computer network having subscribers, an access provider (AP) network, and multiple service provider (SP) networks.

VPN technologies are being used to expand virtual-private-networking closer to the initial network access point for subscribers. Data service providers that in the past have operated relatively centralized networks with dial-in access for subscribers are now pushing their networks closer to subscribers, who in turn are making greater use of Ethernet connectivity which lends itself to integration in VPNs more naturally than does conventional dial-up technology. Additionally, in some areas it is required that so-called "network access providers" (also referred to as "access providers" or APs) that have direct physical connections with subscribers provide subscriber access to other service providers. A further factor shaping the operations of edge devices such as edge routers is the lack of native identification and authentication functions within the Internet Protocol (IP). APs may provide networks dedicated for these and related functions that are performed upon initial subscriber interaction, before the subscriber actually begins utilizing a desired service that is delivered via a corresponding VPN. Thus, there is a need for edge devices capable of managing the involvement of subscribers with multiple VPNs.

A service gateway is disclosed that provides VPN support in the form of multiple independent forwarding components, as well as having functions for adding subscribers to forwarding components and transferring subscribers among forwarding components in a seamless manner.

The disclosed service gateway maintains multiple forwarding components, each forwarding component being operative to provide forwarding of data packets within a corresponding VPN accessible via the service gateway. The service gateway also maintains respective subscriber sessions for a plurality of subscribers coupled to the service gateway via respective subscriber interfaces, wherein each subscriber session involves the forwarding of data packets between a corresponding subscriber and a corresponding VPN by action of a corresponding forwarding component. The association between the subscribers and the forwarding components is independent of the subscriber interfaces such that the respective subscriber sessions of those subscribers reachable via a given interface are associable (i.e. can be associated) with respective different ones of the forwarding components.

Upon detecting an event indicating that a subscriber session is to be transferred from a first VPN to a second VPN, the service gateway modifies the respective forwarding components of the first and second VPNs to reflect that the subscriber session is active in the second VPN and is not active in the first VPN. The service gateway also effects a change of a network address that identifies the corresponding subscriber from a first network address defined in the first VPN to a second network address defined in the second VPN. Several mechanisms for effecting such a change of network address are described.

In one embodiment, the above operations are carried out as part of a transfer of the subscriber from an initial service and to another service selected by the subscriber. The initial service may provide authentication, authorization and accounting operations in relation to the subscriber's session, whereas the new service may be an Internet browsing session in which the subscriber finds and accesses desired information, for example. The service gateway may also need to provide a new network address (e.g., Internet Protocol (IP) address) for identifying the subscriber in data packets exchanged between the subscriber and the selected VPN.

DETAILED DESCRIPTION

FIG. 1 shows a computer network in which subscribers 10 (shown as 10-1, 10-2, ..., 10-N) are connected by respective subscriber links 12 (shown as 12-1, 12-2, ..., 12-N) to an access multiplexer (ACCESS MUX) 14 within an access provider (AP) network 16. The access multiplexer 14 is typically a layer-1 or layer-2 (L1/L2) device according to the well-known Open Systems Interconnect (OSI) seven-layer model. Within the AP network 16, the access multiplexer 14 is coupled to a service gateway 18, which includes data packet routing and/or forwarding functionality as well as higher-level functionality as described below. The service gateway 18 may be coupled to various servers including an authentication, authorization and accounting (AAA) server 20, a policy server 22, a web portal 24, and a Dynamic Host Control Protocol (DHCP) server 26. The service gateway 18 is also coupled to service provider (SP) networks 28 (shown as 28-1, 28-2, . . . , 28-M) via network links 30 (shown as 30-1, 30-2, . . . , 30-M). In a common contemporary configuration, the links 30 may be so-called "label-switched paths" (LSPs) of a Multi-Protocol Label Switched (MPLS) infrastructure. As described in more detail below, the service gateway 18 is seen as a node on each of the SP networks 28. The SP networks 28 are layer-2 or layer-3 VPNs such as virtual local area networks (VLANs), virtual private dial-up networks (VPDNs) or IP VPNs. The network communications between the service gateway 18 and each of the SP networks 28 are carried over the network links 30.

In the system of FIG. 1, each subscriber 10 represents either an individual subscriber device (such as a personal computer) or collections of individual subscriber devices that access the AP network 16 over the associated subscriber link 12. Examples of the latter include a plurality of subscriber devices on a local-area network (LAN) that access the respective link 12 via a router and/or a modem such as a cable modem or digital subscriber loop (DSL) modem. The access multiplexer 18 may be any of various devices including a DSL access multiplexer (DSLAM) or a cable modem termination system (CMTS) for example.

The AP network 16 is often operated by a telecommunications service provider or "carrier" that provides subscribers 10 physical access to a wide-area communications system or network. In the US, examples of such access providers include cable companies such as Comcast and telephone companies such as Verizon. In addition to providing the physical network connectivity, these access providers often provide Internet service and/or other data services, which may or may not be on a subscription basis. In the present description, the AP network 16 is also referred to as the "local" network. The SP networks 28 are assumed to be layer-2 or layer-3 networks that the subscribers 10 desire to have access to even though they do not have direct physical connectivity to them. Examples of such SP networks 28 include America Online (AOL) and Earthlink. In some areas of the world, it is legally mandated that AP networks 16 provide for access to third-party SP networks 28, to foster competition in the market for Internet/data services.

The service gateway 18 incorporates the functionality of layer-2 forwarding and/or layer-3 routing as well as higher-level functions as described herein. In connection with these higher-level functions, the service gateway 18 interacts with the various servers 20-26 of the AP network 16 (and/or similar servers of the SP network(s) 28 as described below). The AAA server 20 is used as part of managing the subscribers 10 as customers, including such functions as confirming subscriber identity and tracking subscriber usage for billing purposes. The policy server 22 oversees the dynamic aspect of the configuration by acting as a policy decision point with the ability to push new configuration to enforcement points such as the service gateway 18. Examples are given below. The web portal 24 serves as a point of interaction for the subscribers 10 when they initiate a session. The DHCP server 26 is used for dynamic assignment of network addresses (e.g. IP addresses) and other configuration information to DHCP clients among the subscribers 10. One or more of the AAA, policy server, web portal, and DHCP functions may be incorporated within the service gateway itself 18 in alternative embodiments. With respect to the DHCP function, it may be desirable to employ multiple DHCP servers in an alternative embodiment, with each DHCP server being associated with a different SP network 28 for example.

As noted, one or more of the SP networks 28 may include its own set of servers such as AAA servers, policy servers, DHCP servers and web portals for use by subscribers specifically associated with such SP networks 28. The servers 20-26 within the AP network 16 can be seen as being shared among multiple service providers, especially among those SP networks 28 not having their own set of such servers.

Figure 2:
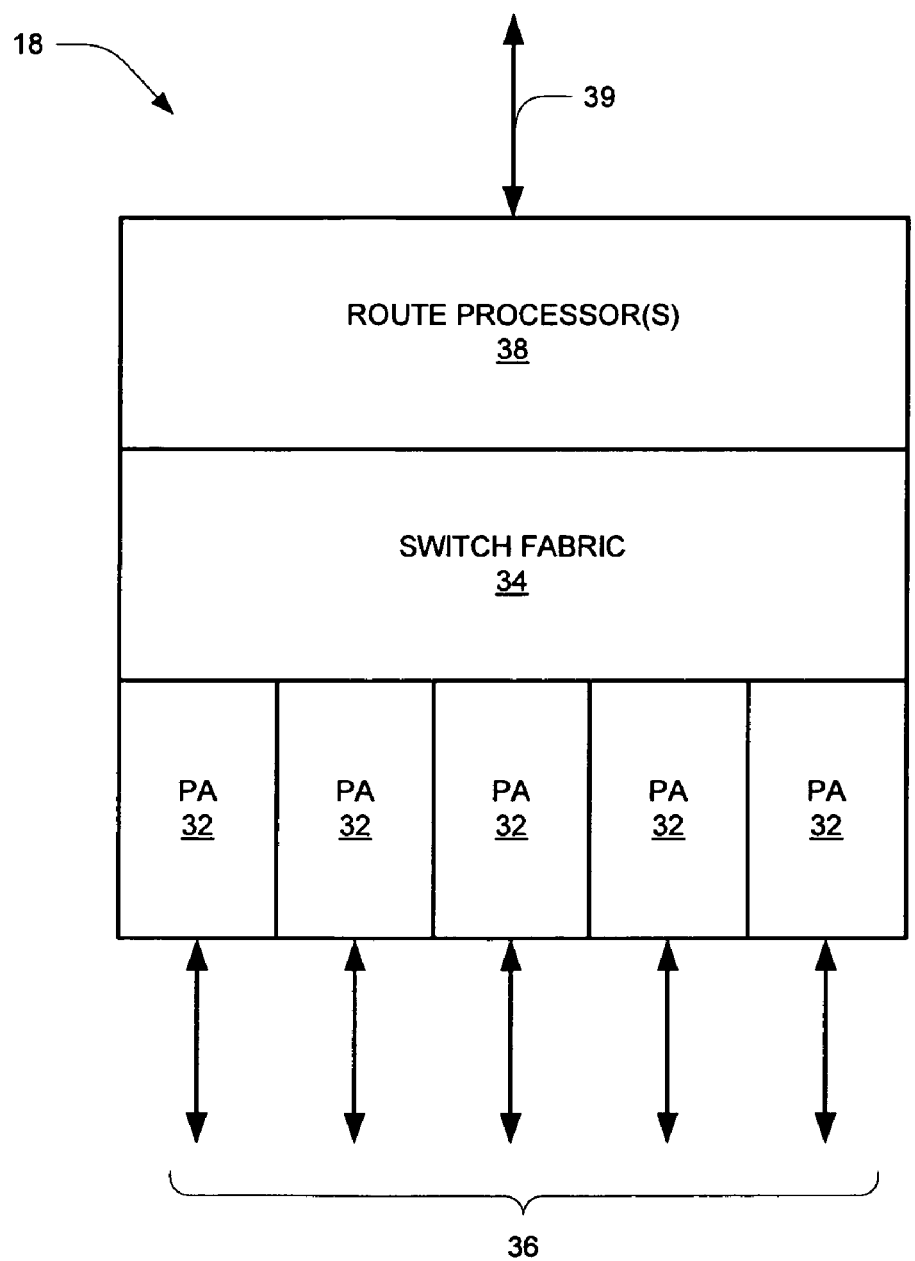
FIG. 2 is a hardware block diagram of a service gateway within the computer network of FIG. 1.

FIG. 2 is a hardware block diagram of one embodiment of the service gateway 18. A plurality of port adapters (PA) 32 are coupled to a switch fabric 34. Each port adapter 32 provides a connection to one or more physical communications links 36, which may be Gigabit Ethernet (GbE) links or fiber-optic links such as Optical Carrier links (OC-12, OC-48 etc.). Each PA 32 may also provide other functions (such as packet forwarding) specific to the traffic appearing on the attached link 36. The physical communications links 36 connect to other devices within the AP network 16 or an SP network 28, and carry the LSPs or other links 30 of FIG. 1. The service gateway 18 also includes one or more route processors 38 that control higher-level operation, including execution of the packet routing and forwarding protocol(s) for example. A route processor 38 may have a separate communications link 39 for operations, administrative and maintenance purposes. In operation, each port adapter 32 may include one or more high-speed forwarding engines populated with forwarding information derived from a complete routing table maintained by the route processor(s) 38. Packets are forwarded from ingress ports to egress ports via the switch fabric 34.

Alternative embodiments of the service gateway 18 may employ different specific hardware configurations. For example, the functions ascribed to the route processor 38 may be performed by one or more processors, which may be centralized or may be distributed among different hardware elements. Both the route processor 38 and such alternative processor arrangements are included within the general term "processor" utilized herein. Also, in an alternative embodiment, the PAs 32 may omit the specialized forwarding engines mentioned above.

Figure 3:
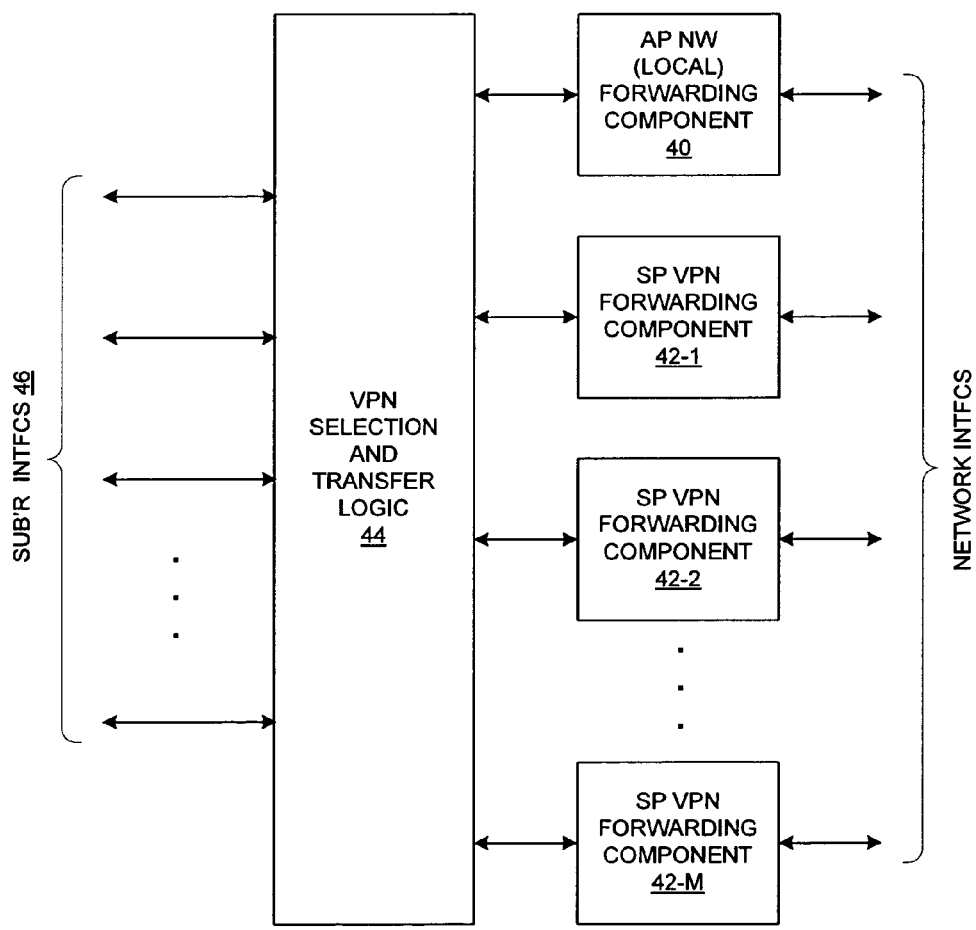
FIG. 3 is a block diagram of pertinent operating software in the service gateway of FIG. 2.

FIG. 3 is a block diagram of certain operating software executed by the processor of the service gateway 18. The software includes an AP network (AP NW) "forwarding component" 40 as well as multiple SP VPN forwarding components 42 (shown as 42-1, 42-2, . . . , 42-M). In the present context, the term "forwarding component" generally refers to logic that performs a routing and/or forwarding operation on data packets belonging to a particular virtual private network (VPN). It may be implemented, for example, as a virtual routing and forwarding (VRF) instance in connection with layer-3 VPNs, or as bridging or switching logic for layer-2 VPNs. VPN selection and transfer logic 44 is disposed between the forwarding components 40, 42 and a plurality of interfaces 46 to the subscribers 10. The subscriber interfaces 46 are generally virtual or logical, and typically there are additional interfaces (not shown) to underlying physical communications media (such as the communications links 12) on which the subscriber interfaces 46 are defined. As an example, a particular link 12 might be an Asynchronous Transfer Mode (ATM) link, and the subscriber interfaces 46 associated with that link 12 correspond to individual virtual connections of the ATM link.

Each forwarding component 40, 42 maintains a respective forwarding database for the associated network 16 or 28. There may also be an associated forwarding table derived from the forwarding database and utilized by the port adapters 32 in forwarding packets from ingress ports to egress ports of the service gateway 18. In general, the different forwarding components 40, 42 are entirely distinct from each other, as are the networks 16 and 28. There may be some overlap of entry information where there is corresponding overlap among the networks 16, 28, such as for routers or other devices that carry traffic crossing between different networks 16, 28. It will be appreciated that the AP NW forwarding component 40 may have much more limited functionality than the SP NW forwarding components 42, due to its more limited role as part of initial subscriber access to the system. Indeed, in an alternative embodiment there may be no need for an explicit AP NW forwarding component 40.

Figure 4:
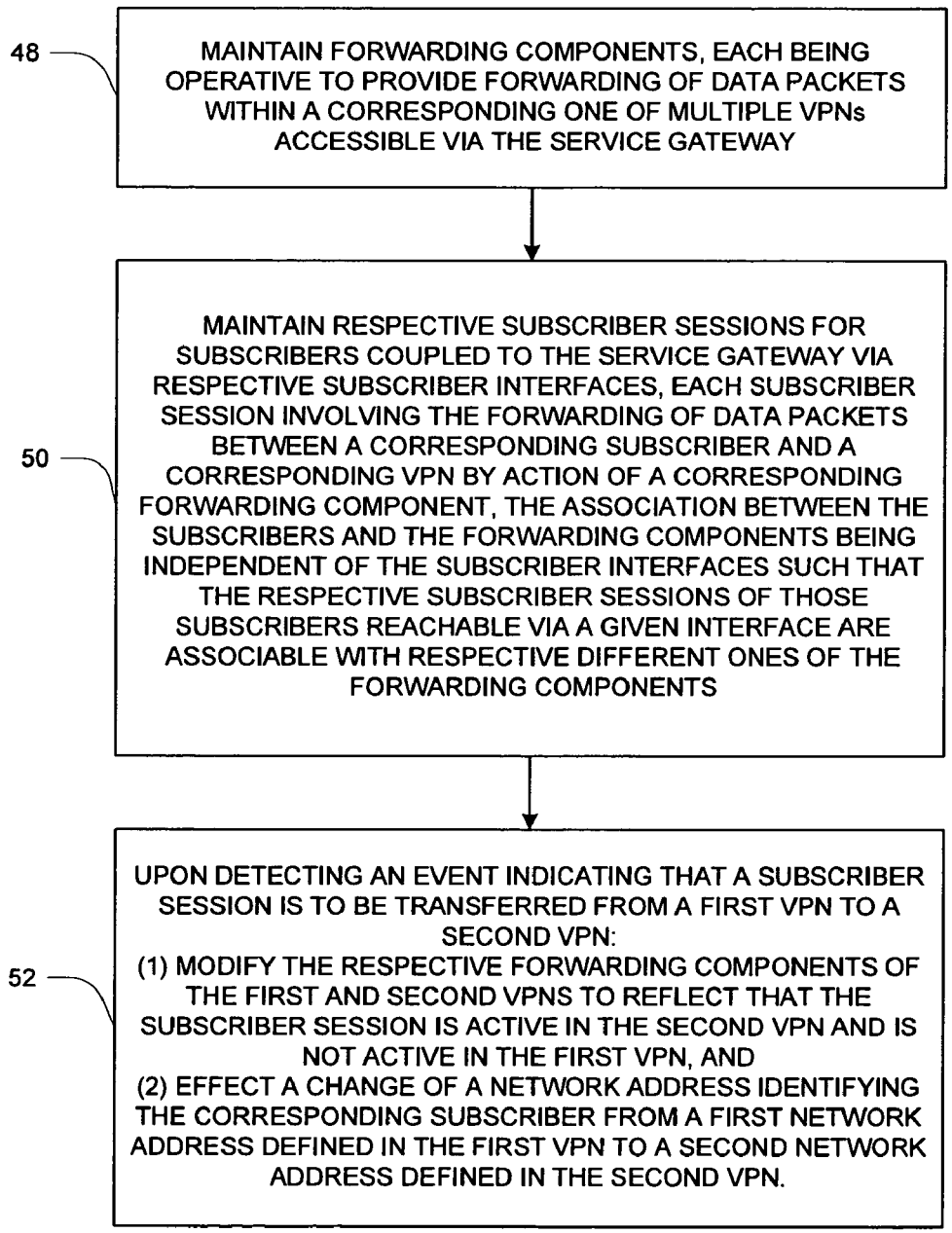
FIG. 4 is a flow diagram broadly depicting operation of the service gateway of FIGS. 2 and 3.

FIG. 4 illustrates a method by which the VPN selection and transfer logic 44 works. In step 48, the VPN selection and transfer logic 44 maintains a plurality of forwarding components such as forwarding components 40, 42, wherein each forwarding component is operative to provide forwarding of data packets within a corresponding one of a plurality of virtual private networks (VPNs) accessible via the service gateway (e.g., SP networks 28).

In step 50, the VPN selection and transfer logic 44 maintains respective subscriber sessions for a plurality of subscribers coupled to the service gateway via respective subscriber interfaces. Each subscriber session involves the forwarding of data packets between a corresponding subscriber and a corresponding VPN by action of a corresponding forwarding component. The association between the subscribers and the forwarding components is independent of the subscriber interfaces, such that the subscriber sessions of those subscribers reachable via a given subscriber interface may be associated with respective different ones of the forwarding components.

In step 52, upon detecting an event indicating that a subscriber session is to be transferred from a first VPN to a second VPN, the VPN selection and transfer logic 44 modifies the respective forwarding components of the first and second VPNs to reflect that the subscriber session is active in the second VPN and is not active in the first VPN, and may also effect a change of a network address identifying the corresponding subscriber from a first network address defined in the first VPN to a second network address defined in the second VPN. The event in step 52 may take the form, for example, of a subscriber's selection of a new service (e.g., at the web portal 24), a control policy action, or termination of a network service (e.g. due to prepaid credit exhaustion or the detection of improper service usage). Upon completion of the transfer, subscriber traffic is routed using an SP NW forwarding component 42 associated with the selected SP network 28 (e.g., SP NW forwarding component 42-2). Specific examples are described below.

It should be noted that although step 52 refers to the transfer of a subscriber from a first VPN to a second VPN, there is normally a preceding time at which the subscriber is placed in an initial VPN. The action is similar to a transfer insofar as it includes adding the subscriber to a VPN and allocating or assigning a network address. This initial subscriber placement may occur, for example, by detection of a request from a subscriber to establish a point-to-point protocol (PPP) session, or a DHCP discovery request. More generally, the first interaction may be in the form of a control message from the subscriber, if a control protocol is employed, or the receipt of a first data message from the subscriber if no session has previously been established.

The VPN selection and transfer logic 44 may obtain and apply control policies for an initial service provided to the subscriber (e.g., in the situation depicted in FIG. 5 below) and/or in connection with the transfer of a subscriber from one VPN to another. The policies may be obtained from the AAA server 20 based on an identification of the subscriber 10 or the link 12 on which an initial subscriber message was received. Alternatively, a set of default policies may have previously been defined (via a user interface to the service gateway 18, for example) and stored for all subscribers or for different classes of subscribers, and these policies may be applied. Control policies govern the transfer of subscribers sessions. An example of a control policy is "upon initial subscriber interaction, add the subscriber to the AP network and direct the subscriber to the AP web portal for authentication." As another example, upon selection of a particular service, a control policy may check the number of active subscribers as a prerequisite for activation. In this case, the event is the service request, the condition is the number of associated sessions, and the action is to activate the service. As another example, a policy may dictate that a subscriber has a sufficient bandwidth allocation to activate a service. A control policy may specify the VPN transfer as a result of some other event, such as a resource failure in an existing domain or the detection of rogue usage by the subscriber, and then the action might be to transfer the subscriber to another VPN (which might be a restricted access or "quarantine" network).

Upon completion of step 52 of FIG. 4, the VPN selection and transfer logic 44 operates in conjunction with the forwarding component 42 of the new VPN to perform packet routing/forwarding and related functions in the context of the selected service. The VPN selection and transfer logic 44 maintains an association between the subscriber 10 and the forwarding component 42 for the newly selected network service. When a packet is received from the subscriber, it is forwarded toward a destination according to routing/forwarding information of the associated forwarding component 42. Similarly, when a packet is received from an SP network 28, it is forwarded toward the destination subscriber 10 according to routing/forwarding information of the associated forwarding component 42. Other functions such as packet filtering, monitoring, statistics gathering etc. may also be performed in accordance with the service that specifies the VPN.

With respect to assigning a new network address in step 52 of the process of FIG. 4, different types of address-reassignment mechanisms may be employed for this operation based on the type of the subscriber session. Generally, these mechanisms fall into two classes. In one class, actions are taken by which the subscriber is provided with a new network address, which the subscriber subsequently uses in data packets to identify itself as the source of the packets. Such methods can only be used where there is some mechanism for dynamically causing the subscriber to change the network address that the subscriber utilizes in data communications packets. In another class of mechanisms, the subscriber continues to use the original address, and some type of translation or substitution is used in the communications path such that the subscriber is identified by the new network address notwithstanding the subscriber's continued use of the original address. An example of such a mechanism is network address translation (NAT). These kinds of methods are used when there is no mechanism for dynamically causing the subscriber to change the network address that the subscriber utilizes in data communications packets.

As an example in the case of PPP sessions, it may be possible to re-negotiate the subscriber session parameters (which include the IP address) using the Internet Protocol Control Protocol (IPCP). The VPN selection and transfer logic 44 may be configured with a pool of allocable IP addresses for each of the SP networks 28, for example. After allocating a new IP address, the VPN selection and transfer logic 44 engages in an IPCP exchange with the subscriber 10 to cause the subscriber to begin using the new IP address rather than the initial IP address originally established for the PPP session.

Alternatively, when the subscriber utilizes a statically assigned IP address with the PPP session (and thus the address cannot re re-negotiated using IPCP as above), the VPN selection and transfer logic 44 may establish a NAT mapping to translate between the subscriber's fixed IP address and the IP address that has been allocated to identify the subscriber in the selected network 28. This NAT mapping is applied between the subscriber interface and the forwarding component 42, in a manner similar to that described below for an IP session.

Another example is an IP session. Where a subscriber 10 employs DHCP to obtain an IP address, it may be desirable to provide a short lease time on the initial address used in the context of an initial service. After the subscriber has selected another service, the next DHCP renewal request from the subscriber is rejected, causing the subscriber to re-initiate DHCP discovery. At that point, the VPN selection and transfer logic 44 can provide the subscriber with the new IP address that is routable in the selected network. It is noted that there will be a period between service selection and the expiration of the lease for the initial IP address during which the subscriber will not yet be able to access the selected SP network 28. The duration of this period can be minimized by using very short lease periods where possible. Also, the service gateway 18 may issue a DHCP FORCE RENEW message to the subscriber 10 to force the subscriber 10 to immediately renew its address lease rather than waiting until the normal renewal time. Either in addition to or in lieu of such measures, network address translation (NAT) can be employed on an interim basis during this period in order to permit the subscriber to access the selected SP network 28 immediately. The use of interim NAT is described more fully below.

Where the service gateway 18 cannot provide a new IP address to the subscriber, such as for example when the subscriber is configured with a static IP address, then the VPN selection and transfer logic 44 may employ a mechanism such as NAT to effectively change the IP address utilized for subscriber traffic within the selected SP network 28. A pair of NAT entries for the subscriber are created in a NAT data structure, one for packets flowing in each direction. For packets flowing from the subscriber 10 to the SP network 28, the source address is replaced with the new IP address allocated for use by the subscriber in the SP network. After this replacement, packets are forwarded according to the forwarding entries for the forwarding component 42 of the selected SP network 28. Packets flowing in the opposite direction are handled in essentially reverse fashion—first directed to the NAT by action of the forwarding component 42, and then forwarded on to the subscriber 10 with replacement of the destination address with the subscriber's IP address obtained from the NAT. Thus, NAT maps the initial network address in data packets exchanged between the service gateway 18 and the subscriber to the new network address in data packets exchanged between the service gateway 18 and the selected layer-3 network.

A third alternative to effect the change of IP address for IP sessions employs a combination of NAT and DHCP. It is assumed that the subscriber initially obtains an IP address using DHCP. At the time that the new service is selected and the subscriber is transferred to the new forwarding component, the VPN selection and transfer logic 44 acts as a DHCP proxy for the subscriber and obtains the new IP address. It then creates a pair of NAT entries in the same manner described above, and handles the subscriber traffic using NAT until the subscriber attempts to renew its IP address using DHCP. At that point, the VPN selection and transfer logic 44 rejects the renewal request and, when the subscriber re-initiates DHCP discovery, provides the subscriber with the newly obtained IP address for the selected SP network 28. At that point, the NAT entries are deleted, and subsequent subscriber traffic is forwarded directly (i.e., without NAT) according to the contents of the forwarding component 42.

It should also be noted that it may not be necessary or possible to effect a change of the subscriber's network address, and thus in some cases no such change is made. One such situation is when the subscriber's network address is public and routable in both the current and new VPNs. Alternatively, the subscriber session may be a layer 2 session and thus the service gateway 18 is not aware of the subscriber's network address.

Figure 5:
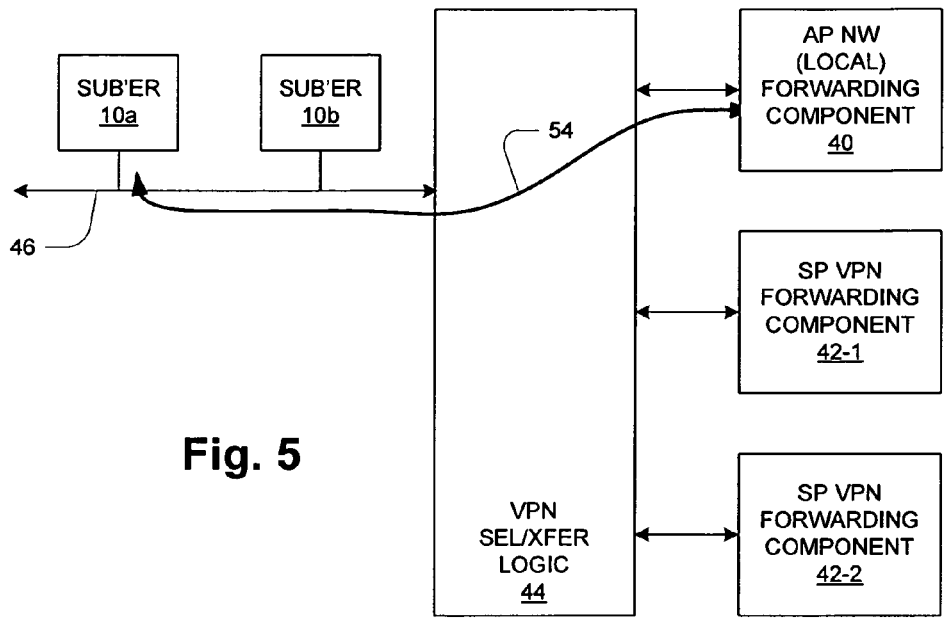
FIGS. 5-7 are block diagrams depicting the transfer of subscriber sessions among different forwarding components within the service gateway of FIGS. 2 and 3.
Figure 6:
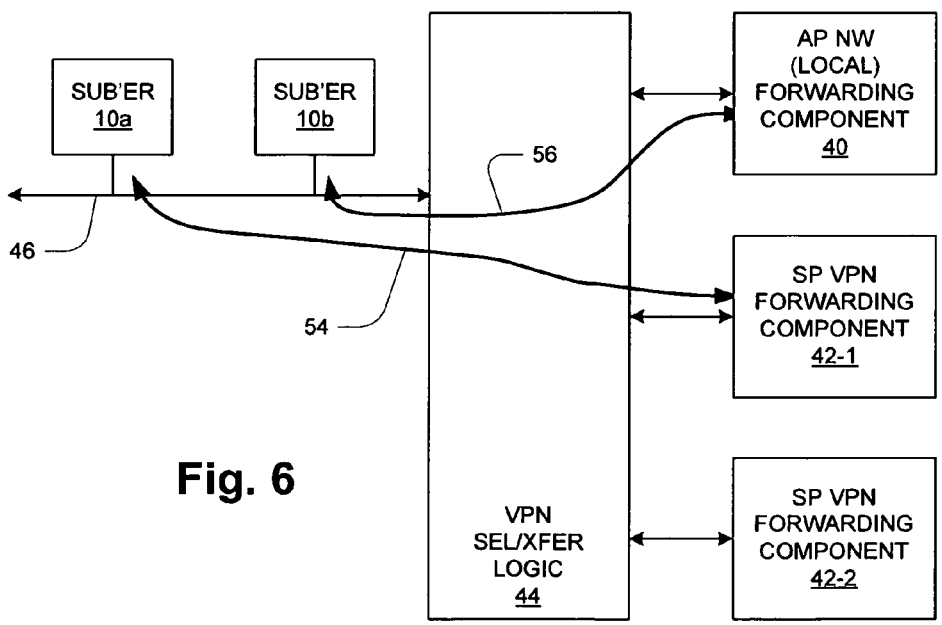
Figure 7:
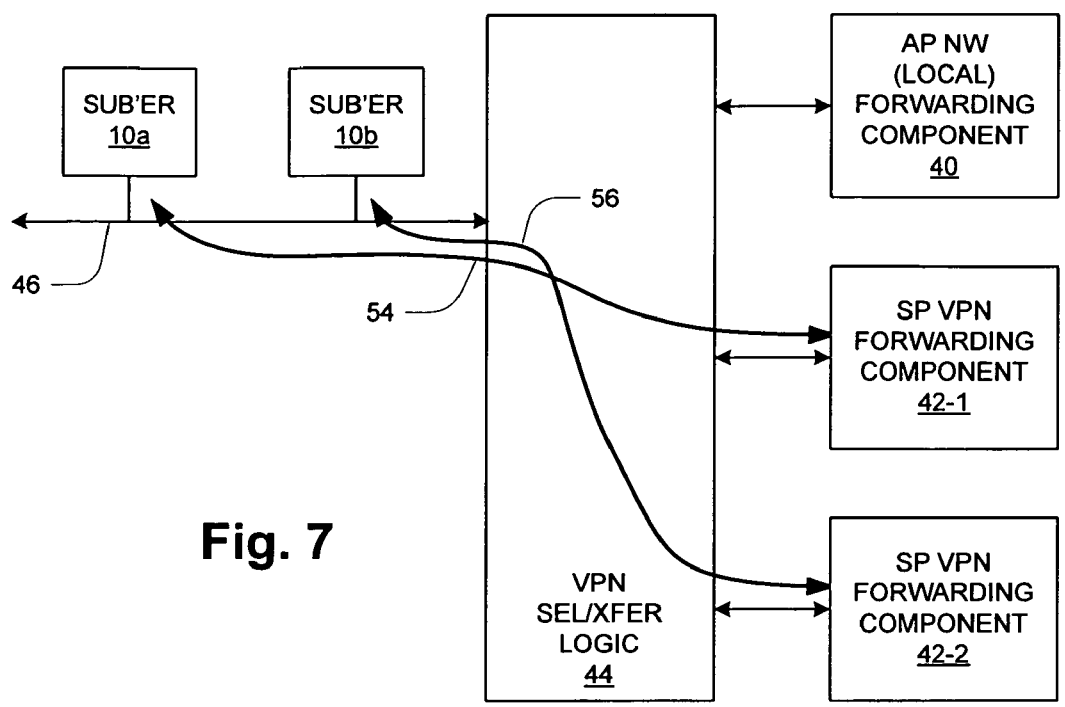

FIGS. 5-7 further illustrate the above-described operation. FIG. 5 shows an initial operating condition in which a first subscriber 10a is engaging in data communications in the local (access) context. The subscriber 10a as well as another subscriber 10b are reachable via the same interface 46. The VPN selection and transfer (SEL/XFER) logic 44 maintains a session 54 that associates the subscriber 10a with the AP NW forwarding component 40. The subscriber 10a is utilizing a network address that is routable/forwardable within the AP NW 16. During this period, the subscriber 10a may interact with the web portal 24 and/or the DHCP server 26 (FIG. 1), and/or cause interactions between the service gateway 18 and some/all of the servers 20-26. In one embodiment, this initial period ends when the subscriber 10a selects a specific service of one of the SP networks 28, such as by successfully logging onto an account at the web portal 24 for example. At this time, step 52 of FIG. 4 is carried out to effect a transfer of the subscriber 10a from the AP NW forwarding component 40 to the forwarding component 42 for the selected SP network 28.

FIG. 6 shows a subsequent period in which the subscriber 10a has successfully been transferred to such other forwarding component, in this case forwarding component 42-1 associated with the SP network 28-1. At the same time, the second subscriber 10b is engaging in data communications in the local context just as the subscriber 10a did earlier. As shown, the VPN selection and transfer logic 44 maintains two sessions 54 and 56. The session 54 associates the subscriber 10a with the forwarding component 42-1, and the session 56 associates the subscriber 10b with the local forwarding component 40. During this period, the subscriber 10b eventually selects a specific service of one of the SP networks 28, as the subscriber 10a previously did.

FIG. 7 shows a subsequent period in which the subscriber 10b has successfully been transferred to the forwarding component associated with the selected SP network, in this case forwarding component 42-2 associated with the SP network 28-2. As shown the session 56 now associates the subscriber 10b with forwarding component 42-2. The VPN selection and transfer logic 44 maintains these sessions until terminated in some fashion, whether by further action of a subscriber 10 or by some operation of the network.

While this invention has been particularly shown and described with references to preferred embodiments thereof, it will be understood by those skilled in the art that various changes in form and details may be made therein without departing from the spirit and scope of the invention as defined by the appended claims.

What is claimed is:

1. A method of operating a service gateway, comprising:
   maintaining a plurality of forwarding components, each forwarding component being operative to provide forwarding of data packets within a corresponding one of a plurality of virtual private networks (VPNs) accessible via the service gateway;
   maintaining respective subscriber sessions for a plurality of subscribers coupled to the service gateway via respective subscriber interfaces, each subscriber session involving the forwarding of data packets between a corresponding subscriber and a corresponding VPN by action of a corresponding forwarding component, the association between the subscribers and the forwarding components being independent of the subscriber interfaces such that the respective subscriber sessions of those subscribers reachable via a given interface are associable with respective different ones of the forwarding components; and
   upon detecting an event indicating that a subscriber session is to be transferred from a first VPN to a second VPN, (1) modifying the respective forwarding components of the first and second VPNs to reflect that the subscriber session is active in the second VPN and is not active in the first VPN, and (2) effecting a change of a network address identifying the corresponding subscriber from a first network address defined in the first VPN to a second network address defined in the second VPN,
   wherein effecting the change of the network address comprises exercising a mechanism for dynamically causing the subscriber whose session is to be transferred to change the network address the subscriber utilizes in data communications packets to the second network address,
   and wherein the subscriber session is an IP session initially associated with the first network address, the first network address having been provided by a preceding dynamic host control protocol (DHCP) process, and wherein effecting the change of the network address comprises (1) rejecting a DHCP renewal request from the subscriber attempting to renew a lease on the first network address, and (2) responding to a subsequent DHCP discovery request from the subscriber by providing the second network address to the subscriber for subsequent use in the data packets exchanged between the subscriber and the second VPN.

2. The method according to claim 1, wherein effecting the change of the network address comprises:
   during an initial interim period in which the subscriber attempts to exchange subscriber data packets with the second VPN using the first network address, applying network address translation (NAT) that maps the first network address in data packets exchanged with the subscriber to the second network address in data packets exchanged with the second VPN; and
   upon responding to the subsequent DHCP discovery request from the subscriber,
   subsequently permitting direct, non-NAT exchange of future data packets between the subscriber and the second VPN.

3. The method according to claim 1, wherein the second VPN is one of a plurality of service provider networks, and wherein the first VPN is an access provider network.

4. The method according to claim 1, further comprising retrieving and applying policies including control policies dictating a response to an event associated with the subscriber.

5. A service gateway for providing subscriber access to multiple virtual private networks (VPNs), comprising:
   a plurality of port adapters for interfacing with subscribers and with the VPNs, the subscribers being coupled to the service gateway via respective subscriber interfaces;
   a switch fabric operative to forward packets from ingress ports to egress ports of the port adapters; and
   a processor operative to:
      maintain a plurality of forwarding components, each forwarding component being operative to provide forwarding of data packets within a corresponding one of a plurality of virtual private networks (VPNs) accessible via the service gateway;
      maintain respective subscriber sessions for a plurality of subscribers coupled to the service gateway via the respective subscriber interfaces, each subscriber session involving the forwarding of data packets between a corresponding subscriber and a corresponding VPN by action of a corresponding forwarding component, the association between the subscribers and the forwarding components being independent of the subscriber interfaces such that the respective subscriber sessions of those subscribers reachable via a given interface are associable with respective different ones of the forwarding components; and
      upon detecting an event indicating that a subscriber session is to be transferred from a first VPN to a second VPN, (1) modify the respective forwarding components of the first and second VPNs to reflect that the subscriber session is active in the second VPN and is not active in the first VPN, and (2) effect a change of a network address identifying the corresponding subscriber from a first network address defined in the first VPN to a second network address defined in the second VPN,
      wherein the processor is operative when effecting the change of the network address to exercise a mechanism for dynamically causing the subscriber whose session is to be transferred to change the network address the subscriber utilizes in data communications packets to the second network address,
      and wherein the subscriber session is an IP session initially associated with the first network address, the first network address having been provided by a preceding dynamic host control protocol (DHCP) process, and wherein the processor is operative when effecting the change of the network address to (1) reject a DHCP renewal request from the subscriber attempting to renew a lease on the first network address, and (2) respond to a subsequent DHCP discovery request from the subscriber by providing the second network address to the subscriber for subsequent use in the data packets exchanged between the subscriber and the second VPN.

6. The service gateway according to claim 5, wherein the processor is operative when effecting the change of the network address to:
   during an initial interim period in which the subscriber attempts to exchange subscriber data packets with the second VPN using the first network address, apply network address translation (NAT) that maps the first network address in data packets exchanged with the subscriber to the second network address in data packets exchanged with the second VPN; and
   upon responding to the subsequent DHCP discovery request from the subscriber, subsequently permit direct, non-NAT exchange of future data packets between the subscriber and the second VPN.

7. The service gateway according to claim 5, wherein the second VPN is one of a plurality of service provider networks, and wherein the first VPN is an access provider network.

8. The service gateway according to claim 5, wherein the processor is further operative to retrieve and apply policies including control policies dictating a response to an event associated with the subscriber.

9. A service gateway for providing subscriber access to multiple virtual private networks (VPNs), comprising:

means for interfacing with a plurality of subscribers and with the VPNs, the subscribers being coupled to the service gateway via respective subscriber interfaces;

means for forwarding packets from ingress ports to egress ports of the interfacing means;

means for maintaining a plurality of forwarding components, each forwarding component being operative to provide forwarding of data packets within a corresponding one of a plurality of virtual private networks (VPNs) accessible via the service gateway;

means for maintaining respective subscriber sessions for the plurality of subscribers, each subscriber session involving the forwarding of data packets between a corresponding subscriber and a corresponding VPN by action of a corresponding forwarding component, the association between the subscribers and the forwarding components being independent of the subscriber interfaces such that the respective subscriber sessions of those subscribers reachable via a given interface are associable with respective different ones of the forwarding components; and means, operative upon detecting an event indicating that a subscriber session is to be transferred from a first VPN to a second VPN, for (1) modifying the respective forwarding components of the first and second VPNs to reflect that the subscriber session is active in the second VPN and is not active in the first VPN, and (2) effecting a change of a network address identifying the corresponding subscriber from a first network address defined in the first VPN to a second network address defined in the second VPN, wherein the means for effecting the change of the network address includes means for exercising a mechanism for dynamically causing the subscriber whose session is to be transferred to change the network address the subscriber utilizes in data communications packets to the second network address, and wherein the subscriber session is an IP session initially associated with the first network address, the first network address having been provided by a preceding dynamic host control protocol (DHCP) process, and wherein the means for effecting the change of the network address comprises means for (1) rejecting a DHCP renewal request from the subscriber attempting to renew a lease on the first network address, and (2) responding to a subsequent DHCP discovery request from the subscriber by providing the second network address to the subscriber for subsequent use in the data packets exchanged between the subscriber and the second VPN.

* * * * *